US008547972B2

(12) United States Patent
Mahdavi et al.

(10) Patent No.: US 8,547,972 B2
(45) Date of Patent: Oct. 1, 2013

(54) BYPASS MECHANISM FOR VIRTUAL COMPUTING INFRASTRUCTURES

(75) Inventors: Jamshid Mahdavi, San Jose, CA (US); Greg Veres, Waterloo (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 302 days.

(21) Appl. No.: 13/016,890

(22) Filed: Jan. 28, 2011

(65) Prior Publication Data

US 2012/0198441 A1 Aug. 2, 2012

(51) Int. Cl.
H04L 12/28 (2006.01)

(52) U.S. Cl.
USPC ........................................................ 370/389

(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–529
See application file for complete search history.

(56) References Cited

U.S. PATENT DOCUMENTS

| 6,327,242 | B1 * | 12/2001 | Amicangioli et al. | 370/216 |
| 6,327,643 | B1 * | 12/2001 | Egan | 711/134 |
| 6,535,509 | B2 * | 3/2003 | Amicangioli | 370/389 |
| 2002/0071422 | A1 * | 6/2002 | Amicangioli | 370/351 |
| 2011/0004876 | A1 * | 1/2011 | Wu et al. | 718/1 |
| 2011/0320633 | A1 * | 12/2011 | Burmester et al. | 709/239 |

OTHER PUBLICATIONS

S. Jackson, H. Lew, application entitled "By-Pass Port Facilitating Network Device Failure Detection in Wide Area Network Topologies", U.S. Appl. No. 11/479,979, filed Jun. 30, 2006.

* cited by examiner

Primary Examiner — Jung-Jen Liu
(74) Attorney, Agent, or Firm — Baker Botts L.L.P.

(57) ABSTRACT

In accordance with one embodiment of the present disclosure, a system includes one or more computer systems including a memory, one or more processors, and a bypass switch with an open position and a closed position. The one or more computer systems further include computer-executable program code. The computer-executable program code includes one or more virtual machines modules including computer-executable instructions configured, when executed, to cause the one or more processors to implement one or more virtual machines that host one or more guest operating systems and one or more applications. The computer-executable program code further includes a virtual bypass switch module including computer-executable instructions configured, when executed, to cause the one or more processors to, responsive to the availability of the one or more applications, forward packets received on the first physical network interface to at least one of the one or more virtual machines.

20 Claims, 5 Drawing Sheets

BYPASS MECHANISM FOR VIRTUAL COMPUTING INFRASTRUCTURES

TECHNICAL FIELD

The present disclosure relates generally to bypass mechanisms for virtual computing architectures.

BACKGROUND

Application traffic management devices, and a variety of other network devices, are often deployed, physically and/or logically, at the edges of enterprise networks to control bandwidth utilization, for example, across an access link to a wide area network (WAN), to filter network traffic for security related purposes, to optimize or accelerate network traffic, and the like. Such network devices typically include one or more inside or LAN ports, and one or more outside or WAN ports. When the traffic management device is situated at that single gateway between one and other networks, it will logically be able to process all inbound and outbound traffic. As a result, the device can effectively classify flows and maintain rate control policies on specific partitions.

However, application traffic management devices can sometimes become non-functional due to hardware or software failures. Typically, a bypass switch is utilized to physically shunt network traffic away from a packet processing section of the non-functioning application traffic management device in order to maintain network connectivity. For example, upon the failure of a network device, a short circuit is created between the inside or LAN port and the outside or WAN port to allow signals carrying network traffic to bypass the processing path of the network device. Such functionality is sometimes referred to as "fail-to-wire." U.S. Pat. No. 6,327,242, for example, discloses one possible fail-to-wire implementation.

SUMMARY

In accordance with one embodiment of the present disclosure, a system includes one or more computer systems including a memory, one or more processors, a bypass switch, a first physical network interface and a second physical network interface. The bypass switch has an open position and a closed position and the first physical network interface has a first port and the second physical network interface has a second port. The closed position corresponds to the bypass switch forming a direct connection between the first and second ports of the first and second physical network interfaces thus bypassing processing of the data signals by the first and second physical network interfaces. In the open position, the first and second physical network interfaces are operative to process data signals received at the first and second ports. The bypass switch is responsive to control signals to move from the open position to the closed position. The one or more computer systems further include computer-executable program code stored in the memory and executable by the one or more processors. The computer-executable program code includes one or more virtual machines modules including computer-executable instructions configured, when executed, to cause the one or more processors to implement one or more virtual machines that host one or more guest operating systems and one or more applications. The computer-executable program code further includes a virtual bypass switch module including computer-executable instructions configured, when executed, to cause the one or more processors to monitor availability of the one or more applications hosted by the one or more virtual machines. The computer-executable instructions are further configured, when executed, to cause the one or more processors to, responsive to the availability of the one or more applications, forward packets received on the first physical network interface to at least one of the one or more virtual machines. The computer-executable instructions are further configured, when executed, to cause the one or more processors to, responsive to unavailability of the one or more applications, forward the packets received on the first physical network interface to the second physical network interface.

Numerous technical advantages are provided according to various embodiments of the present disclosure. Particular embodiments of the disclosure may exhibit none, some, or all of the following advantages depending on the implementation. In certain embodiments, a computer system may include both a bypass switch and a virtual bypass switch module. As such, the bypass switch may cause data signals to bypass processing by the computer system when it has been determined that the computer system has failed, and the virtual bypass switch module may cause packets to bypass a virtual machine implemented on the computer system when it has been determined that an application on the virtual machine is unavailable (e.g., such as when the application running on the virtual machine fails or crashes).

In another embodiment, a first computer system may include both a bypass switch and a virtual bypass switch module, and one or more other computer systems may implement one or more virtual machines. As such, the virtual bypass switch module may provide forwarding functionalities even though the virtual machines are implemented on different computer systems than the first computer system that includes the virtual bypass switch module.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Embodiments of the present invention and its advantages are best understood by referring to FIGS. 1 through 6 of the drawings, like numerals being used for like and corresponding parts of the various drawings.

Figure 1:
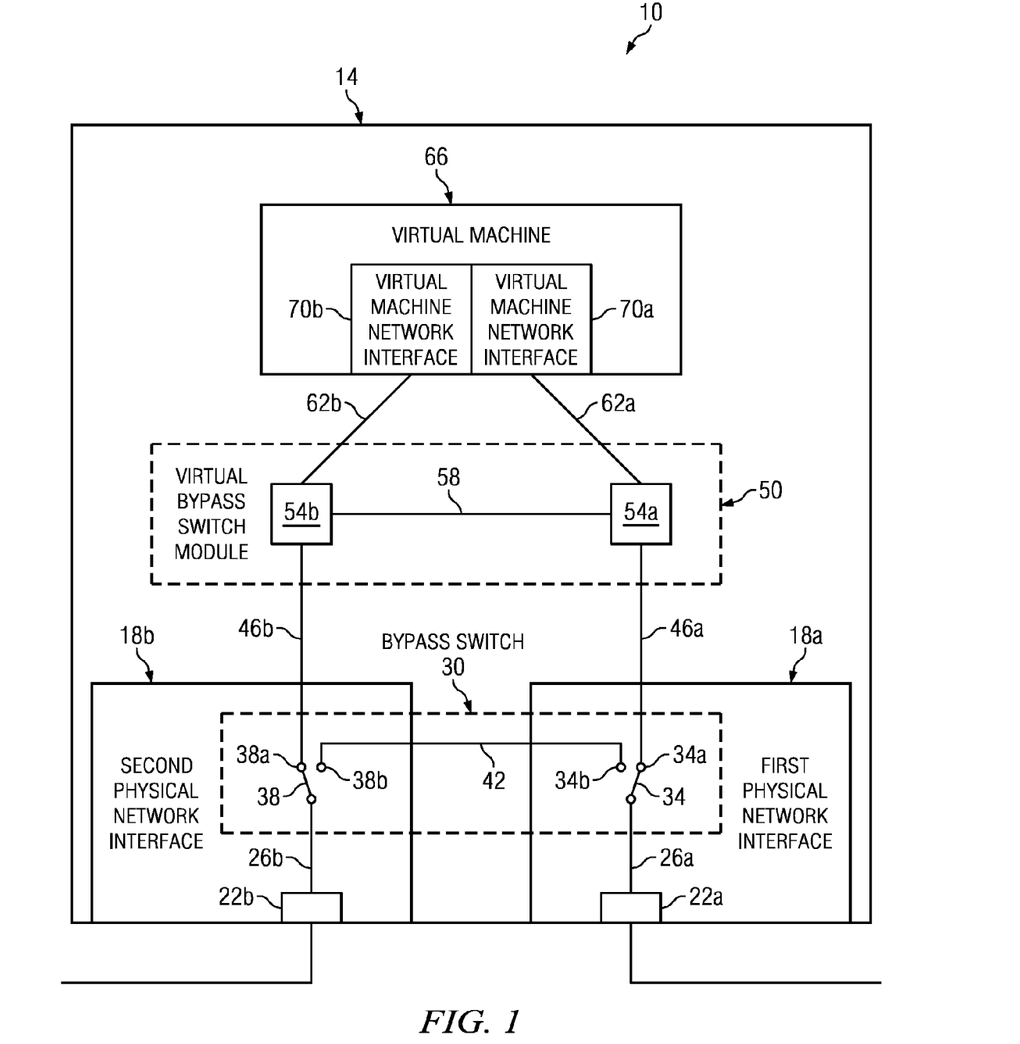
FIG. 1 is a functional block diagram illustrating a schematic for implementing a bypass switch and a virtual bypass switch module in a computer system.

FIG. 1 is a functional block diagram illustrating a schematic 10 for implementing a physical bypass switch and a virtual bypass switch module in a computer system, in accordance with an example embodiment. According to the illustrated embodiment, the schematic 10 includes a computer system 14 with a bypass switch 30 and a virtual bypass switch module 50. The bypass switch 30 is an electro-mechanical mechanism that may cause data signals to bypass processing by the computer system 14 when it has been determined that the computer system 14 has failed. Furthermore, the virtual bypass switch module 50 may cause packets to bypass a virtual machine 66 implemented on the computer system 14 when it has been determined that an application on the virtual machine 66, or the virtual machine 66 itself, is unavailable.

Included in the schematic 10 is the computer system 14, a first physical network interface 18a, a second physical network interface 18b, an incoming connector port 22a, an outgoing connector port 22b, the bypass switch 30, various switches 34 and 38, various switch points 34a, 34b, 38a, and 38b, the virtual bypass switch module 50, various packet forwarding decisions 54a and 54b, the virtual machine 66, virtual machine network interfaces 70a and 70b, various PCB traces 26a, 26b, and 42, and various communication paths 46a, 46b, 58, 62a, and 62b.

It should be noted that FIG. 1 is a fairly high-level block diagram. As such, the traces 26a, 26b, and 42 are only meant to be illustrative of a connection (e.g., such as an electrical connection, optical connection, or any other suitable connection) between various components and should not necessarily be interpreted as a direct connection as other components may be interspersed along the traces. Furthermore, the communication paths 46a, 46b, 58, 62a, 62b are only meant to be illustrative of logical and/or physical communication paths between various applications and virtual machines implemented in the computer system 14, and should not necessarily be interpreted as a direct connection as other components may be interspersed along the communication paths.

The computer system 14 may include the bypass switch 30. Furthermore, the computer system 14 may implement the virtual bypass switch module 50 and the virtual machine 66 on one or more processors (not shown) in the computer system 14. The computer system 14 may be, for example, an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Further details of example embodiments of the computer system 14 are described in FIG. 6.

The first and second physical network interfaces 18 may process signals, perform other functionality to process signals to resolve packets (e.g., such as by converting the signals to packets using, for example, a software device driver), and may read packets into a memory of a device, such as the computer system 14. In one embodiment, the first and second physical network interfaces 18 are the network communications interfaces that receive and transmit packets over the computer network environment. In one implementation, the first and second physical network interfaces 18a and 18b reside on separate network interface cards operably connected to the system bus of the computer system 14. In another implementation, the first and second physical network interfaces 18a and 18b reside on the same network interface card. In addition, the first and second physical network interfaces 18a and 18b can be wired network interfaces, such as Ethernet (IEEE 802.3), or synchronous optical network ("SONET") interfaces, and the like. Although FIG. 1 illustrates two physical network interfaces 18, FIG. 1 may include additional network interfaces, beyond the physical network interfaces 18a and 18b, to support additional network paths or other functionality. Furthermore, U.S. application Ser. No. 10/843,185 provides a description of the operation of various modules (according to one possible implementation of the claimed embodiments), such as network interface drivers, and data structures for receiving into memory and processing packets encountered at the physical network interfaces 18a and 18b.

According to the illustrated embodiment, the first physical network interface 18a includes the incoming connector port 22a for receiving data signals from another device (such as a router or another computer system). Furthermore, the second physical network interface 18b includes the outgoing connector port 22b for sending data signals from the computer system 14 to another device. Although FIG. 1 illustrates the incoming connector port 22a as receiving data signals and the outgoing connector port 22b as sending signals, each connector port 22 may both receive and send the data signals. As such, the data signals may be received at the computer system 14 through outgoing connector port 22b and subsequently sent from the computer system 14 through the incoming connector port 22a. Connector ports 22a, 22b may be configured according to any physical configuration suitable to the environment, such as, but not limited to, RJ-45 or RJ-11 connectors.

The bypass switch 30 may form connections (e.g., electrical, optical, etc.) so as to cause data signals to be processed by the physical network interfaces 18a and 18b, or to cause the data signals to bypass processing (e.g., signal demodulation, frame/packet detection, etc.) by the physical network interfaces 18a and 18b. According to the illustrated embodiment, the bypass switch 30 may include switches 34 and 38 for forming connections. The bypass switch 30 may cause the switches 34 and 38 to be in an open position when the computer system 14 is determined to be operational. In the open position, the switch 34 may form a connection (e.g., electrical, optical, etc.) between the incoming port 22a, the trace 26a, the switch point 34a, and the communication path 46a, and the switch 38 may form a connection (e.g., electrical, optical, etc.) between the outgoing port 22b, the trace 26b, the switch point 38a, and the communication path 46b. As such, when the computer system 14 is determined to be operational, incoming signals bearing network traffic packets enter computer system 14 at incoming connector port 22a and travel through the trace 26a and the switch 34. This may allow the first physical network interface 22a to process the data signals and send the packets to system memory of the computer system 14 for further processing. When processing of the packets (as is discussed below) has finished, the packets may be logically forwarded to the second physical network interface 22b for transmission along a network communications path. The second physical network interface 22b may process the packets and then send the packets as data signals through the switch 38, the trace 26b, and the outgoing connector port 22b.

The bypass switch 30 may also cause the switches 34 and 38 to be in a closed position when the computer system 14 is determined to be not operational (e.g., failed). In a closed position, the switch 34 may form a connection (e.g., electrical, optical, etc.) between the incoming connector port 22a, the trace 26a, the switch point 34b, and the trace 42, and the switch 38 may form a connection (e.g., electrical, optical, etc.) between the outgoing connector port 22b, the trace 26b, the switch point 38b, and the trace 42. As such, when the computer system 14 is determined to be not operational, incoming signals (electrical, optical, etc.) bearing network traffic packets enter computer system 14 at the incoming connector port 22a and travel through the trace 26a, the switch 34, the trace 42, the switch 38, the trace 26b, and the outgoing communication port 22b. As such, the received data signals may bypass processing by the physical network interfaces 18a and 18b, and may further bypass being sent to the processor of the computer system 14.

The bypass switch 30 may determine whether to cause the switches 34 and 38 to be in either the open or closed position based on a firmware or software module of the computer system 14. For example, during normal operation of the computer system 14, the firmware or software module (not shown) of the computer system 14 may be operative to assert a control signal, which is routed to a general purpose input-output (GPI/O) pin to maintain the open position of the switches 34 and 38. Restated, the asserted control signal may cause the switches 34 and 38 to be connected to points 34a and 38a, respectively, which forwards packet-bearing signals to be processed by the physical network interfaces 18a and 18b.

When a failure condition occurs, for example a software or hardware failure in the computer system 14, the control signals may no longer be asserted and the switches 34 and 38 may move to points 34b and 38b, respectively. By default (e.g., when no control signal is asserted), the switch 34, the switch 38, and the trace 42 may create a "fail-to-wire" short circuit between the physical network interfaces 18a and 18b. Accordingly, the control signal may not be asserted when the computer system 14 is powered off, being powered off, or powered on, but booting and not yet initialized. In addition, the control signal may be de-asserted in response to a system crash even though the computer system 14 is still powered on. For example, a watchdog module may be employed to address system software crashes or failures. During normal operation, a timer monitored by the watchdog module may continually reset. During a system crash, however, the watchdog module may time out, causing a non-maskable interrupt (NMI) to be generated. As such, the computer system 14 generates a crash log, and resets the system. During the system reset (such as a re-boot), the control signal is de-asserted resulting in the "fail-to-wire" bypass mode discussed herein. Still further, the control signal can be de-asserted and asserted based on explicit commands transmitted by an application or an administrator (e.g., such as the system administrator for the computer system 14). For example, in response to a link status error indicating a broken link (for example), the application or administrator can cause the control signal to be de-asserted during the error condition.

The virtual bypass switch module 50 may forward a packet to the virtual machine 66, or may forward the packet back to the physical network interfaces 18a and 18b, thereby causing the packet to bypass the virtual machine 66. The virtual bypass switch module 50 may include one or more computer-executable programs that may be executed by the processor of the computer system 14. For example, the virtual bypass switch module 50 may include computer-executable instructions that may cause the processor to forward the packet to the virtual machine 66 or forward the packet back to the physical network interfaces 18a and 18b.

According to the illustrated embodiment, the virtual bypass switch module 50 may include the packet forwarding decision logic 54a and 54b. The packet forwarding decision logic 54a and 54b may be embodied in computer-executable instructions that may cause the processor to forward a packet in the computer system 14. When an application is available on the virtual machine 66, the packet forwarding decisions 54a and 54b may cause the packets to be forwarded to the virtual machine 66. For example, the packet forwarding logic 54a and 54b may cause the processor of the computer system 14 to forward the packets to the virtual machine 66. On the other hand, when an application hosted on the virtual machine 66 is unavailable, the packet forwarding decisions 54a and 54b may cause the packets to be forwarded (via communication path 58) back to the physical network interfaces 18a and 18b. For example, the packet forwarding decisions 54a and 54b may cause the processor of the computer system 14 to forward the packets back to the physical network interfaces 18a and 18b.

In particular, when a packet is received at the processor of the computer system 14 from the communication path 46a, the processor may execute the computer-executable program code of the virtual bypass switch module 50 to determine where the packet should be forwarded. When the application hosted on the virtual machine 66 is available, the virtual bypass switch module 50 may cause, via the packet forwarding logic 54a, the processor to forward the packet over the communication path 62a to the virtual machine 66. As such, the packet may be sent to the virtual machine 66 for processing by the application running on the virtual machine 66. On the other hand, when the application hosted on the virtual machine 66 is unavailable (e.g., such as when the application running on the virtual machine fails or crashes, the virtual machine 66 fails, etc.), the virtual bypass switch module 50 may cause, via the packet forwarding decision 54a, the processor to forward the packet to the second physical network interface 18b through the communication path 58, the packet forwarding decision 54b, and the communication path 46b. As such, the packet may bypass being processing by the application running on the virtual machine 66. In other implementations, the forwarding decision may cause the packet to bypass a first application hosted on a first virtual machine and to be forwarded to a second virtual machine for processing by a second application.

The virtual bypass switch module 50 may determine whether the application running on the virtual machine is available in any suitable manner. For example, the virtual bypass switch module 50 may determine whether the application is available based on "passive" failure detection, or "active" failure detection. In the passive failure detection, the virtual bypass switch module 50 may cause the processor to monitor for a "heartbeat" from the virtual machine 66. For example, while an application on the virtual machine 66 is available, the virtual machine 66 may emit a heartbeat signal. This heartbeat signal may be emitted by the virtual machine 66 at predetermined times. For example, the heartbeat signal may be emitted every second, every minute, or any other period of time. As such, as long as the processor continues to detect the heartbeat signal, the virtual bypass switch module 50 may assume that the application is still available. However, if the virtual bypass switch module 50 fails to detect the heartbeat signal from the virtual machine 66 after a certain period of time (e.g., such as a time period that is longer than the predetermined time period between heartbeat signals), the virtual bypass switch module 50 may assume that the application is no longer available. Accordingly, the virtual bypass switch module 50 may cause any received packets to be forwarded back to the physical network interfaces 18*a* and 18*b* or another virtual machine, bypassing the virtual machine 66.

In active failure detection, the virtual bypass switch module 50 may cause the processor to probe the virtual machine 66 for certain capabilities. For example, the processor may send a "ping" to the virtual machine 66, causing the virtual machine to respond. If the virtual machine 66 responds, the virtual bypass switch module 50 may assume that the application is available. However, if the virtual machine 66 does not respond, or the signal fails for any other reason, the virtual bypass switch module 50 may assume that the application is not available. Accordingly, the virtual bypass switch module 50 may cause any received packets to be forwarded back to the physical network interfaces 18*a* and 18*b*, bypassing the virtual machine 66.

In one embodiment, the virtual bypass switch module 50 may further include computer-executable program code for determining which physical network interface 18*a* or 18*b* to forward a packet. For example, if the packet was received from the first physical network interface 18*a*, the virtual bypass switch module 50 may determine that the packet needs to be sent back to the second physical network interface 18*b* so that the packet can continue traveling over the network towards its destination. In one embodiment, the virtual bypass switch module 50 may determine which physical network interface 18 to forward the packet to based on a data field in the wrapper structure associated with the packet as stored in system memory. For example, the virtual machine 66 or the physical network interfaces 18 may tag the wrapper of the packet to indicate where the packet originated from and/or where the packet should be forwarded to.

The virtual machine 66 may be a running instantiation of a device, such as a computer system, that can execute or operate in a virtualized execution environment. For example, the virtual machine 66 may emulate the hardware (such as the microprocessor or controller) of the device, and may further emulate an operating system that may run one or more applications installed on the virtual machine 66. In a particular implementation, the virtual machine 66 fully simulates the complete hardware of the device, allowing a guest operating system to run in connection with the virtual machine 66 and one or more applications to run in connection with the guest operating system.

The virtual machine 66 can be implemented using a Type 1 or Type 2 hypervisor. A Type 1 hypervisor runs directly on the hardware; a Type 2 hypervisor runs on another operating system, such as Linux. The virtual machine 66 can run any operating system supported by the virtual hardware, and can also run any application. For example, the virtual machine 66 may host one or more "guest" operating systems and one or more applications. In one embodiment, the virtual machine 66 may include a hardware emulation layer and a software emulation layer.

The hardware emulation layer usually includes various hardware emulation components or modules, each of which correspond to one or more pieces of hardware of a device. For example, the hardware emulation layer may include a processor emulator that emulates the processor of the device, a memory emulator that emulates the memory storage or subsystem of the device, a network interface emulator that emulates the one or more network interfaces (e.g., WiFi, Bluetooth, etc.) of the device, an input/output (I/O) emulator that emulates the one or more I/O devices (e.g., keypads, wheels, sliders, buttons, etc.) of the device, a display emulator that emulates the display screen on the device, etc. Each emulator imitates or duplicates the behavior of the piece of hardware it emulates. It generally maintains the look, feel, operations, characteristics, behavior, etc. of an actual physical component of hardware, even when that actual physical component is not present in computer system 14.

There are a variety of different ways to implement the individual emulators or modules included in the hardware emulation layer. According to one implementation, the emulators or modules are implemented as computer-executable programs, represented by computer program instructions stored in various forms of computer-readable media. For example, one way to emulate the processor of a device is to use an interpreter, which follows the execution flow of the program code and, for every machine code instruction encountered, executes operations on the processor(s) of the computer system 14 that are semantically equivalent to the original instruction. Some pre-packaged CPU simulators may also be incorporated into the process emulator.

To emulate the software components of a device, according to one implementation, the virtual machine 66 includes a software emulation layer, which includes a copy of an operating system, one or more device drivers, and/or one or more applications. The software may be executed within the context of the hardware emulation layer of the virtual machine 66 as described above. For example, to emulate a specific piece of application software, the computer system 14 first causes the hardware emulation layer to be loaded and executed, and then causes the copy of the piece of application software from the software emulation layer to be executed on top of the hardware emulation layer (e.g., interacting with the hardware emulation layer).

The virtual machine 66 may run any suitable application. For example, the virtual machine 66 may run an application corresponding to a network application traffic management device. In such an example, the network application traffic management device application is operative to classify and manage data flows traversing a network path to which the computer system 14 is operably connected. In one implementation, the network application traffic management device application also includes functionality operative to monitor the performance of the network (such as network latency) and/or network applications. As a further example, the virtual machine 66 may run an application corresponding to a security gateway or proxy, a firewall, a packet capture device, WAN optimization, and the like.

According to the illustrated embodiment, when the application running on the virtual machine 66 is available, the packets received at the processor from physical network interfaces 18*a* and 18*b* may be forwarded to the virtual machine 66 for processing by the application. The packets may be forwarded to the virtual machine 66 through the communication paths 62*a* and 62*b*, respectively, and may be received by the virtual machine 66 at the virtual machine network interface 70*a* or 70*b* emulated on the virtual machine 66. Once the application is finished processing a packet (e.g., such processing may include modification of the packet or replacement of the original packet with one or more different packets, or any other suitable processing), the packet may be sent by the virtual machine network interface 70*b* or 70*a* back to the virtual bypass switch module 50. As such, the virtual bypass switch module 50 may cause the processor to forward the packet back to either the first physical network interface 18*a* or the second physical network interface 18*b* in order to forward the packet out of the computer system 14 as a data signal.

Accordingly, as is discussed above, the bypass switch 30 of the computer system 14 may cause data signals to bypass processing by the computer system 14 when it has been determined that the computer system 14 has failed, and the virtual bypass switch module 50 of the computer system 14 may cause packets to bypass a virtual machine 66 implemented on the computer system 14 when it has been determined that an application on the virtual machine 66 in unavailable.

As is noted above, the virtual machine 66 emulates two virtual machine network interfaces: virtual machine network interface 70a and virtual machine network interface 70b. In particular implementations, virtual machine network interface 70a may comprise an inside or LAN interface, while virtual machine network interface 70b may comprise an outside or WAN interface. Accordingly, in certain implementations, packets received from communication path 62a may be forwarded to the virtual machine 66 through the virtual machine network interface 70a, and after processing, may exit the virtual machine 66 through the virtual machine network interface 70b. Furthermore, in certain implementations, packets received from communication path 62b may be forwarded to the virtual machine 66 through the virtual machine network interface 70b, and after processing, may exit the virtual machine 66 through the virtual machine network interface 70a. In further implementations, the virtual bypass switch module 50 may determine which of the virtual machine network interfaces 70a and 70b to forward the packet to.

Figure 2:
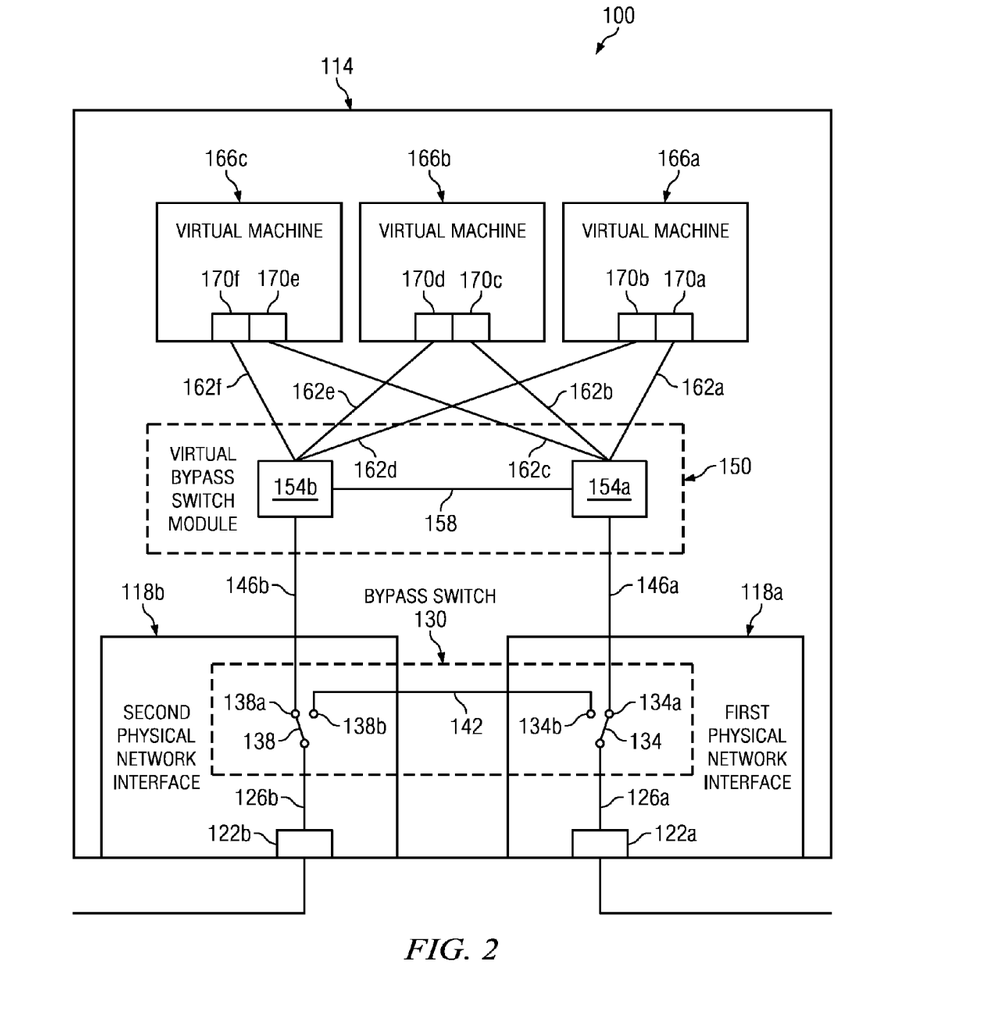
FIG. 2 is a functional block diagram illustrating a schematic for implementing a bypass switch and a virtual bypass switch module in a computer system implementing more than one virtual machine.

FIG. 2 is a functional block diagram illustrating a schematic 100 for implementing a bypass switch and a virtual bypass switch module in a computer system implementing more than one virtual machine, in accordance with an example embodiment. According to the illustrated embodiment, the schematic 100 includes a computer system 114 with a virtual bypass switch module 150 and various virtual machines 166a, 166b, and 166c. The virtual bypass switch module 150 may cause packets to be forwarded to one or more of the virtual machines 166 when it has been determined that an application running on the virtual machines 166 is available, or may further cause packets to bypass one or more of the virtual machines 166 when it has been determined that an application running on the virtual machines 166 is unavailable. For example, each of the virtual machines 166 may each host one or more applications that are operative to process packets as they traverse a communications path to which the computer system 114 is operably connected.

Included in schematic 100 is the computer system 114, a first physical network interface 118a, a second physical network interface 118b, an incoming connector port 122a, an outgoing connector port 122b, the bypass switch 130, various switches 134 and 138, various switch points 134a, 134b, 138a, and 138b, the virtual bypass switch module 150, various packet forwarding decisions 154a and 154b, the virtual machines 166a, 166b, and 166c, various virtual machine network interfaces 170a, 170b, 170b, 170c, 170d, 170e, and 170f, various PCB traces 126a, 126b, and 142, and various communication paths 146a, 146b, 158, 162a, 162b, 162c, 162d, 162e, and 162f. According to the illustrated embodiment, the computer system 114 of FIG. 2 may be similar to the computer system 14 of FIG. 1; the first physical network interface 118a of FIG. 2 may be similar to the first physical network interface 18a of FIG. 1; the second physical network interface 118b of FIG. 2 may be similar to the second physical network interface 18b of FIG. 1; the incoming connector port 122a of FIG. 2 may be similar to the incoming connector port 22a of FIG. 1; the outgoing connector port 122b of FIG. 2 may be similar to the outgoing connector port 22b of FIG. 1; the bypass switch 130 of FIG. 2 may be similar to the bypass switch 30 of FIG. 1; the switches 134 and 138 of FIG. 2 may be similar to the switches 34 and 38 of FIG. 1; the switch points 134a, 134b, 138a and 138b of FIG. 2 may be similar to the switch points 34a, 34b, 38a and 38b of FIG. 2; the virtual machines 166a, 166b, and 166c of FIG. 2 may be similar to the virtual machine 66 of FIG. 1; the virtual machine network interfaces 170a, 170b, 170c, 170d, 170e, and 170f of FIG. 2 may be similar to the virtual machine network interfaces 70a and 70b of FIG. 1; the traces 126a, 126b, and 142 of FIG. 2 may be similar to the traces 26a, 26b, and 42 of FIG. 1; and the communication paths 146a, 146b, 158, 162a, 162b, 162c, 162d, 162e, and 162f of FIG. 2 may be similar to the communication paths 46a, 46b, 58, 62a, and 62b of FIG. 1.

As is discussed above, the schematic 100 includes the virtual bypass switch module 150, and the virtual machines 166a, 166b, and 166c. The virtual bypass switch module 150 of FIG. 2 may be similar to the virtual bypass switch module 50 of FIG. 1. As such, the virtual bypass switch module 150 may cause packets to be forwarded to one or more virtual machines 166a, 166b, or 166c, thereby forwarding the packets to be processed by one or more applications running on the virtual machines 166a, 166b, and 166c when it has been determined that applications running on the virtual machines 166a, 166b, and 166c are available. Furthermore, the virtual bypass switch module 150 may further cause the packets to be forwarded (via communication path 158) to the physical network interfaces 118a and 118b, thus bypassing the virtual machines 166a, 166b, and 166c when it has been determined that applications running on the virtual machines 166a, 166b, and 166c are not available.

Since the computer system 114 is implementing more than one virtual machine 166a, 166b, and 166c, the virtual bypass switch module 150 may further determine which of the virtual machine 166a, 166b, and 166c to forward a packet to. For example, the virtual bypass switch module 150, and packet forwarding decisions 154a and 154b, may determine that a particular packet received at the processor of the computer system 114 should be forwarded to, for example, the virtual machine 166a, as opposed to the virtual machines 166b and 166c. The virtual bypass switch module 150 may determine which of the virtual machines 166a, 166b, and 166c to forward the packet to in any suitable manner. For example, the virtual bypass switch module 150 may determine to send a packet to a certain virtual machine 166 based on one or more indications from the virtual machines 166a, 166b, and 166c; one or more instructions received at the virtual bypass switch module 150 from a system administrator of the computer system 114 (e.g., such as a human administrator overseeing the computer system 114, or one or more particular aspects of the computer system 114); one or more computer-executable instructions included in the virtual bypass switch module 150; or any combination of two or more of these.

The virtual bypass switch module 150 may determine which of the virtual machines 166 to send certain packets to based on an indication from the virtual machines 166. For example, each of the virtual machines 166a, 166b, and 166c may specify a subset of packets they are operable to process. For example, the virtual machine 166a may prompt the virtual bypass switch module 150 to only forward user datagram protocol (UDP) packets to the virtual machine 166a. As another example, the virtual machine 166a may prompt the virtual bypass switch module 150 to only forward transmission control protocol (TCP) packets to the virtual machine 166a. Based on such indications from the virtual machines 166a, 166b, and 166c, themselves, the virtual bypass switch module 150 may determine to send certain packets to, for example, the virtual machine 166a, and also may determine to send other packets to the virtual machines 166b and 166c. In one embodiment, the indications from the virtual machines 166 may be provided to the virtual bypass switch module 150 based on packet capture (pcap) or any suitable application programming interface (API).

The virtual bypass switch module 150 may determine which of the virtual machines 166 to forward a packet to based on instructions from a system administrator of the computer system 114, such as instructions embodied in a config file. For example, the system administrator may utilize an API in order to designate what type of packets should be forwarded to each of the virtual machines 166. For example, if a first virtual machine 166, such as the virtual machine 166a, is already being used by the system administrator to perform certain processes unrelated to packet processing, the system administrator may designate that none of the packets received at the processor of the computer system 114 should be forwarded to the virtual machine 166a. Based on such an indication, the virtual bypass switch module 150 may forward all of the received packets to only the virtual machines 166b and 166c. As another example, the system administrator may designate the type of packets that may be forwarded to each of the virtual machines 166. For example, similar to the indications that may be made by the virtual machines 166 themselves, the system administrator may designate that a certain virtual machine 166, for example, the virtual machine 166b, receive only TCP packets. In other embodiments, the system administrator may determine which of the virtual machines 166 receive certain packets based on any other suitable criteria.

The virtual bypass switch module 150 may determine which of the virtual machines 166 to forward a packet to based on computer-executable code included in the virtual bypass switch module 150. As an example, the virtual bypass switch module 150 may include computer-executable code for determining where to forward a packet to based on load balancing. For example, if certain packets may be forwarded to more than one of the virtual machines 166, such as, for example, the virtual machine 166a and the virtual machine 166b, the virtual bypass switch module 150 may forward the packets in order to balance the load of each of the virtual machines 166a and 166b in a parallel fashion. In such an example, the virtual bypass switch module 150 may determine to forward 50% of the packets to the virtual machine 166a and 50% of the packets to virtual machine 166b. Furthermore, in order to balance the loads, the virtual bypass switch module 150 may determine to send any suitable percentage of packets to the virtual machines 166. As an example, if a certain virtual machine 166, such as the virtual machine 166a, is conducting other processes, the virtual bypass switch module 150 may determine that that the virtual machine 166a should receive a smaller percentage of the packets, such as only 10%. The virtual bypass switch module 150 may also determine which virtual machine 166 to forward the packets to based on failure of one or more of the virtual machines 166. For example, if an application in, for example, the virtual machine 166a is not available, the virtual bypass switch module 150 may determine that the packets should be forwarded to the virtual machine 166b instead of the virtual machine 166a. In another implementation, one of the virtual machines such as 166b may operate in a standby mode and essentially operate as a redundant backup to virtual machine 166a. Virtual bypass switch module 150 may operate to forward all or a given subset of traffic to virtual machine 166a and switch future traffic to virtual machine 166b, if a failure of virtual machine 166a is detected or some other condition, such as a software upgrade or the like, requires the deactivation of virtual machine 166a.

As another example, the virtual bypass switch module 150 may determine which of the virtual machines 166 to forward a packet to based on the need to forward the packet to multiple virtual machines 166 in a serial fashion. For example, the computer system 114 may process certain packets by first forwarding the packet to, as one example, the virtual machine 166a, and then subsequently forwarding the packet to the virtual machine 166b for further processing. The virtual bypass switch module 150 may make this determination based on the wrapper of the packet, or based on a tag applied to the packet. In one embodiment, the tag may be applied by a process hosted on the virtual machines 166. For example, after the virtual machine 166a has finished processing a packet, the virtual machine 166a may apply a tag to the packet to indicate to the virtual bypass switch module 150 that the packet should subsequently be forwarded to another virtual machine 166, such as, for example, the virtual machine 166b. As such, when the packet is forwarded back to the virtual bypass switch module 150 from the virtual machine 166a, the virtual bypass switch module 150 may determine that the packet should be subsequently forwarded to the virtual machine 166b for further processing. Based on such a determination, the virtual bypass switch module 150 may forward the packet in a serial fashion to any suitable number of virtual machines 166.

The virtual machines 166a, 166b and 166c of FIG. 2 may be similar to the virtual machine 66 of FIG. 1. As such, each of the virtual machines 166a, 166b, and 166c may emulate the hardware (such as the microprocessor or controller) of a device, and may further emulate an operating system that may run one or more applications installed on the respective virtual machine 166. The hardware and operating systems being emulated on each of the virtual machines 166a, 166b, and 166c may be the same, or may be different. Furthermore, each of the applications running on the virtual machines 166a, 166b, and 166c may be the same, or may be different. Although FIG. 2 illustrates three virtual machines 166, any suitable number of the virtual machines 166 may be included in the computer system 114. For example, the computer system 114 may include less than three virtual machines 166, or more than three virtual machines 166.

Accordingly, as is discussed above, the bypass switch 130 of the computer system 114 may cause data signals to bypass processing by the computer system 114 when it has been determined that the computer system 114 has failed, and the virtual bypass switch module 150 of the computer system 114 may cause packets to bypass one or more of the virtual machines 166 implemented on the computer system 114 when it has been determined that an application on the virtual machines 66 is unavailable.

Figure 3:
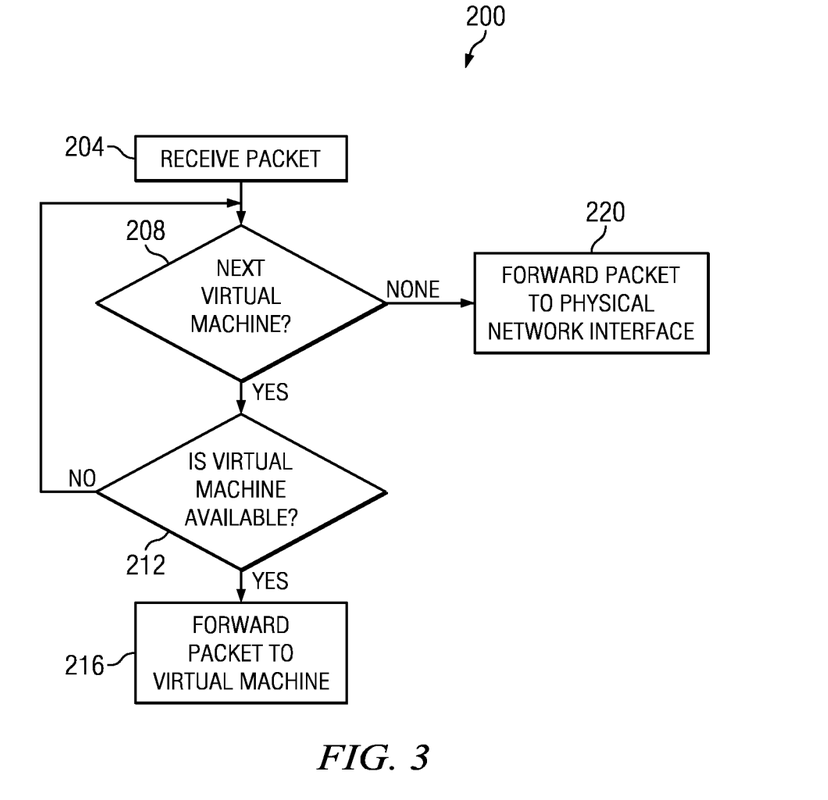
FIG. 3 is a flow chart diagram illustrating a process flow for forwarding a packet to a virtual machine when an application running on a virtual machine is available, and forwarding the packet to a physical network interface when the application running on the virtual machine is not available.

FIG. 3 is a flow chart diagram illustrating a process flow for forwarding a packet to a virtual machine when an application running on the virtual machine is available, and forwarding the packet to a physical network interface when the application running on the virtual machine is not available, thereby bypassing the virtual machine. The process flow may be implemented in connection with a virtual bypass switch module being executed on a processor of a computer system.

At step 204, a packet is received. At step 208, a virtual machine (VM) that may process the packet is determined. For example, if there are more than one virtual machines that may process the packet, one of those virtual machines is determined to be the virtual machine that may process the packet. As another example, if only a single virtual machine may process the packet, that particular machine is determined to be the virtual machine that may process the packet. As a further example, if the packet is to be processed by both a first virtual machine and a second virtual machine, it may be determined that the first virtual machine is the virtual machine that may process the packet at this time. In one embodiment, this determination may be made based on indications from the virtual machine, indications made by a system administrator of the computer system, or by computer-executable code included in the virtual bypass switch module.

If there is a virtual machine that may process the packet, the method moves to step 212 where it is determined whether that particular virtual machine and the application running on that virtual machine is available. The determination of whether or not an application is available may be made through active monitoring of the virtual machine (e.g., such as probing the virtual machine to determine whether or not it is available), or through a passive method (e.g., such as waiting to receive a heartbeat signal from the virtual machine). If the virtual machine and the application running on the virtual machine is determined to be available, the packet is forwarded to the virtual machine for processing at step 216. On the other hand, if the virtual machine and the application running on the virtual machine is determined to be unavailable, the method moves back to step 208 where it is determined whether there is another virtual machine that may process the packet.

If there is another virtual machine that may process the packet, steps 212 and 216 may be repeated. For example, there may be another virtual machine that may process the packet if more than one virtual machine is capable of processing the packet, but the first virtual machine's application was unavailable. As another example, there may be another virtual machine that may process the packet if the packet is to be processed by both a first virtual machine and a second virtual machine.

On the other hand, if there is no other virtual machine that may process the packet, the packet is forwarded to the physical network interface at step 220. For example, there may be no other virtual machine that may process the packet if the packet has already been processed by a virtual machine. In such an example, by forwarding the packet to the physical network interface, the packet may be sent back along a network so that it may reach its destination. As another example, there may be no other virtual machine that may process the packet if only a single virtual machine was capable of processing the packet, but that particular machine's application was unavailable. In such an example, by forwarding the packet to the physical network interface, the packet may bypass any processing of the packet by the virtual machines.

Figure 4:
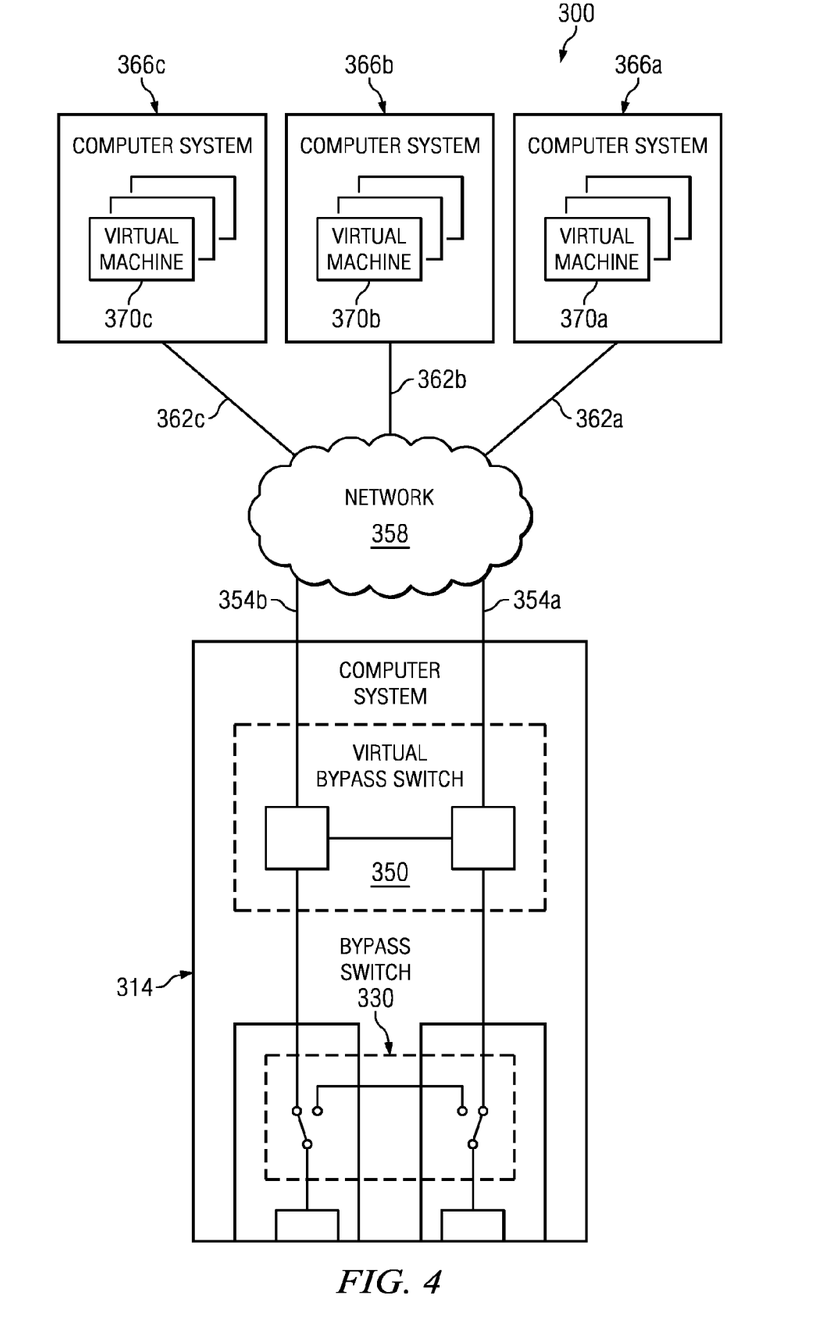
FIG. 4 is a functional block diagram illustrating a schematic for implementing a bypass switch and a virtual bypass switch module in more than one computer systems.

FIG. 4 is a functional block diagram illustrating a schematic 300 for implementing a bypass switch and a virtual bypass switch in more than one computer systems, in accordance with an exemplary embodiment. According to the illustrated embodiment, the schematic 300 includes a computer system 314 with a bypass switch 330 and a virtual bypass switch module 350, and the schematic 300 also includes computer systems 366a, 366b, and 366c each implementing one or more virtual machines 370a, 370b and 370c, respectively. The bypass switch 330 may cause data signals to bypass processing by the computer system 314 when it has been determined that the computer system 314 has failed. Furthermore, the virtual bypass switch module 350 may cause the packets to bypass the one or more virtual machines 370a, 370b, and 370c implemented on the computer systems 366a, 366b, and 366c, respectively, when it has been determined that an application running on the virtual machines 370a, 370b, and 370c is unavailable. Accordingly, the virtual bypass switch module 350 may provide forwarding functionalities (e.g., such as either forwarding the packets to the virtual machines 370, or bypassing the virtual machines 370) even though the virtual machines 370 are implemented on different computer systems 366 than the computer system 314 where the virtual bypass switch module 350 is executed.

Included in the schematic 300 is the computer system 314, the bypass switch 330, the virtual bypass switch module 350, a network 358, the computer systems 366a, 366b, and 366c, the virtual machines 370a, 370b, and 370c, and various communication paths 354a, 354b, 362a, 362b, and 362c. According to the illustrated embodiment, the computer system 314 of FIG. 4 is similar to the computer system 114 of FIG. 2; the bypass switch 330 of FIG. 4 is similar to the bypass switch 130 of FIG. 2; the virtual bypass switch module 350 of FIG. 4 is similar to the virtual bypass switch module 150 of FIG. 2; and the one or more virtual machines 370a, 370b, and 370c of FIG. 4 are similar to the virtual machines 166a, 166b, and 166c of FIG. 2.

As is discussed above, the computer system 314 of FIG. 4 is similar to the computer system 114 of FIG. 2. The computer system 314 may further include a tunneling module operative to establish and maintain tunnels over a communications path (e.g., such as communication paths 354a, 354b, 362a, 362b, and 362c) through the network 358 and between the computer system 314 and the computer systems 366a, 366b, and 366c. The tunneling module includes tunneling functionality based on one or more transport and encapsulation protocols. In one embodiment, the tunneling module includes a variety of tunnel capabilities, including the ability to employ different transport and encapsulation protocols.

The tunneling module is also operative to handle the path between the computer system 314 and the computer systems 366a, 366b, and 366c, using encapsulation and transport technologies, such as Generic Routing Encapsulation (GRE) protocol (RFC 2890), IP in IP Tunneling protocol (RFC 1853), and/or any other suitable protocol (such as link layer encapsulation). The tunneling module is operative to support one or more reliable transport protocols (e.g., TCP), and one or more unreliable transport layer protocols (e.g., UDP). Further information regarding tunneling capabilities may be found in patent application Ser. No. 11/834,576, entitled "System and Method of Traffic Inspection and Stateful Connection Forwarding Among Geographically Dispersed Network Appliances Organized as Clusters," which is incorporated herein by reference.

The network 358 may connect the computer system 314 to the computer systems 366a, 366b, and 366c, transporting one or more signals to and from the computer system 314 and the computer systems 366a, 366b, and 366c. The network 358 may refer to any interconnecting system capable of transmitting audio, video, signals, data, messages, or any combination of the preceding. The network 358 may comprise all or a portion of a server backplane, a high-speed switch fabric, a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

The computer systems 366a, 366b, and 366c may implement the one or more virtual machines 370a, 370b, and 370c respectively. The computer systems 366a, 366b, and 366c may each be, for example, an embedded computer system, a system-on-chip (SOC), a single-board computer system (SBC) (such as, for example, a computer-on-module (COM)

or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Further details of example embodiments of the computer systems 366a, 366b, and 366c are described in FIG. 6. Although the schematic 300 illustrates three computer systems 366, the schematic 300 may include any suitable number of computer systems. For example, the schematic 300 may include less than three computer systems 366 or more than three computer systems 366.

Furthermore, although the schematic 300 illustrates the bypass switch 330 and the virtual bypass switch module 350 on a single computer system 314, in other implementations, the bypass switch 330 may be located on a first computer system and the virtual bypass switch module 350 may be executed on a second computer system that is completely separate from the first computer system. In such an embodiment, the first and second computer systems may each include tunneling modules, such as is described above. As such, encapsulated packets may be forwarded from the first computer system to the virtual bypass switch module 350 on the second computer system, and encapsulated packets may also be forwarded to the virtual machines 370a, 370b, and 370c implemented on the computer systems 366a, 366b, and 366c, respectively.

Additionally, although the schematic 300 illustrates the virtual machines being implemented on only computer systems 366a, 366b, and 366c, in other implementations, the computer system 314 may implement one or more virtual machines also. As such, the virtual bypass switch module 350 may providing forwarding functions (e.g., such as either forwarding the packets to the virtual machines, or bypassing the virtual machines) for virtual machines implemented on the computer system 314, and also the virtual machines 370a, 370b, and 370c implemented on the computer systems 366a, 366b, and 366c, respectively.

Figure 5:
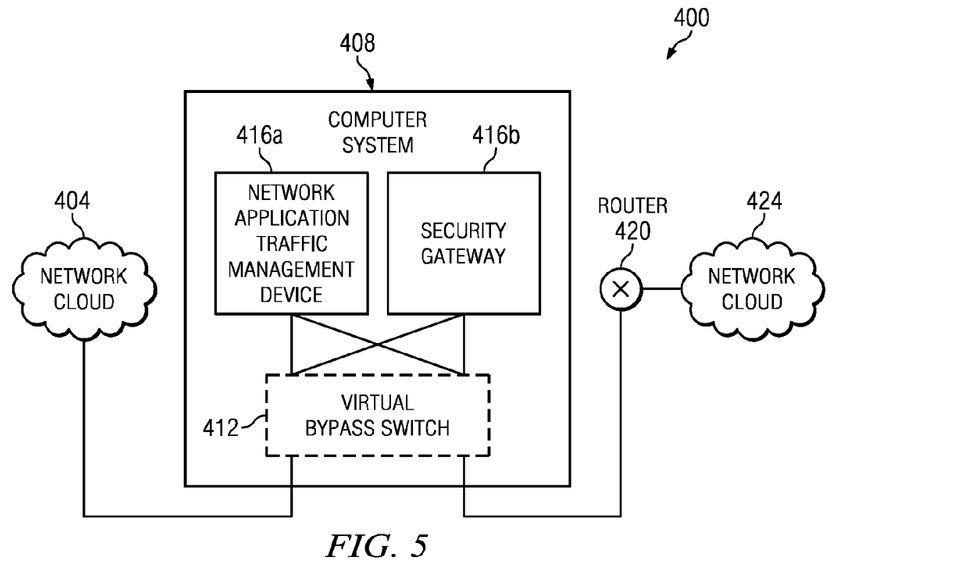
FIG. 5 illustrates a basic environment in which an embodiment of a virtual bypass switch module operates.

FIG. 5 illustrates a basic environment in which an embodiment of a virtual bypass switch module operates. FIG. 5 illustrates a network cloud 404, such as an open, wide-area network, connected to a computer system 408. FIG. 5 also illustrates the computer system 408 connected to a network device 420, such as a router, and further connected to a network cloud 424, such as an open, wide-area network. In one embodiment, one or more devices (not shown) connected to the network cloud 404 may send data signals for transport over the network cloud 404, the router 420, and the network cloud 424 in order to be received at one or more devices (not shown) connected to the network cloud 424.

In such an embodiment, the computer system 408 may act as an intermediate network device that receives the data signals carrying network traffic packets while they are being transported to the network devices connected to the network cloud 424 from the network devices connected to network cloud 404. When the computer system 408 receives the packets, the computer system 408 may cause the packets to be processed by the application 416a, such as a network application traffic management device application, and/or the application 416b, such as a security gateway application. For example, when the applications 416a and 416b are available on implemented virtual machines in the computer system 408, the virtual bypass switch module 412 may forward the received packets to the applications 416a and 416b for processing. On the other hand, if the applications 416a and 416b are unavailable, the virtual bypass switch module 412 may forward the received packets back to the physical network interfaces (not shown) in the computer system 408, resulting in the packets bypassing the applications 416a and 416b.

After the packets have been processed by the applications 416a and 416b, or after the packets have bypassed processing by the applications 416a and 416b, the packets may be forwarded along their path to their destination network devices. Accordingly, the virtual bypass switch module 412 may forward packets for processing by applications 416a and 416b when the applications are available, and may bypass the applications 416a and 416b (and the virtual machines that are implementing such applications) when the applications 416a and 416b are unavailable.

Figure 6:
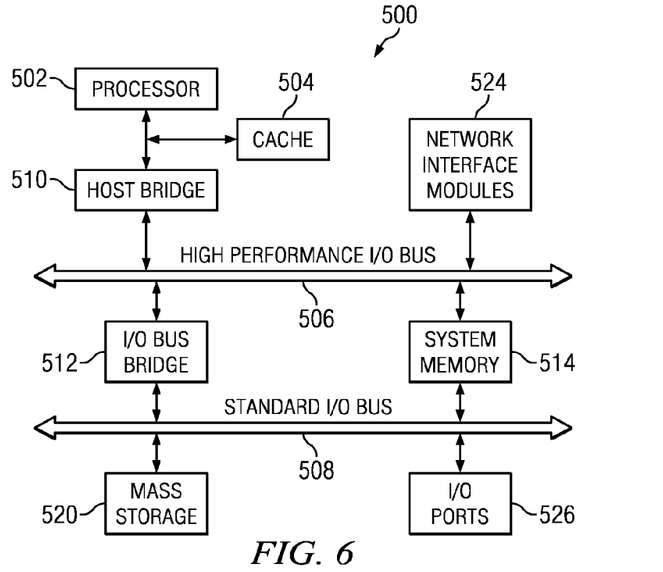
FIG. 6 illustrates an example computing system architecture, which may be used to implement a virtual bypass switch module.

While the methods and systems of the present invention have been described above with reference to specific embodiments, some or all of the elements or operations thereof may be implemented using a computer system having a general purpose hardware architecture. FIG. 6 illustrates an example computing system architecture, which may be used to implement one or more of the operations or elements described herein. In one implementation, a hardware system 500 comprises a processor 502, a cache memory 504, and one or more software applications and drivers directed to the functions described herein.

Additionally, the hardware system 500 includes a high performance input/output (I/O) bus 506 and a standard I/O bus 508. A host bridge 510 couples the processor 502 to the high performance I/O bus 506, whereas an I/O bus bridge 512 couples the two buses 506 and 508 to each other. A system memory 514 and network/communication interface modules 524 are coupled to the bus 506. The hardware system 500 may further include video memory (not shown) and a display device coupled to the video memory. A mass storage 520 and an I/O ports 526 are coupled to the bus 508. The hardware system 500 may optionally include a keyboard and pointing device, and a display device (not shown) coupled to the bus 508. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of the hardware system 500 are described in greater detail below. In particular, the network interface modules 524 provide communication between the hardware system 500 and any of a wide range of networks, such as an Ethernet (e.g., IEEE 802.3) network, etc. The mass storage 520 provides permanent storage for the data and programming instructions to perform the above described functions, whereas the system memory 514 (e.g., DRAM) provides temporary storage for the data and programming instructions when executed by the processor 502. The I/O ports 526 are one or more serial and/or parallel communication ports that provide communication between additional peripheral devices, which may be coupled to the hardware system 500.

The hardware system 500 may include a variety of system architectures; and various components of the hardware system 500 may be rearranged. For example, a cache 504 may be on-chip with the processor 502. Alternatively, the cache 504 and the processor 502 may be packed together as a "processor module," with the processor 502 being referred to as the "processor core." Furthermore, certain implementations of the present invention may not require nor include all of the above components. For example, the peripheral devices shown coupled to the standard I/O bus 508 may couple to the high performance I/O bus 506. In addition, in some implementations only a single bus may exist, with the components of the hardware system 500 being coupled to the single bus. Furthermore, the hardware system 500 may include additional components, such as additional processors, storage devices, or memories. As discussed above, in one embodiment, the operations of the virtual bypass switch module described herein are implemented as a series of software routines run by the hardware system 500. These software routines comprise a plurality or series of instructions to be executed by a processor in a hardware system, such as the processor 502. Initially, the series of instructions are stored on a storage device, such as the mass storage 520. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via the network/communication interface modules 524. The instructions are copied from the storage device, such as the mass storage 520, into the memory 514 and then accessed and executed by the processor 502.

An operating system manages and controls the operation of the hardware system 500, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. In one embodiment, the hardware system 500 may include any suitable hypervisor. For example, the hardware system 500 may include a Type I hypervisor, such as vmware ESX or ESXi.

The above-described embodiments advantageously provide various methods, systems and apparatuses for bypassing an application running on a virtual machine when the application is unavailable, and forwarding a packet to the application when the application is available. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope

What is claimed is:

1. A system, comprising:
one or more computer systems comprising:
a memory,
one or more processors;
a bypass switch, a first physical network interface and a second physical network interface, wherein the bypass switch has an open position and a closed position and the first physical network interface has a first port and the second physical network interface has a second port; wherein the closed position corresponds to the bypass switch forming a direct connection between the first and second ports of the first and second physical network interfaces thus bypassing processing of the data signals by the first and second physical network interfaces; wherein, in the open position, the first and second physical network interfaces are operative to process data signals received at the first and second ports; and wherein the bypass switch is responsive to control signals to move from the open position to the closed position; and computer-executable program code stored in the memory and executable by the one or more processors, the computer-executable program code comprising one or more virtual machines modules comprising computer-executable instructions configured, when executed, to cause the one or more processors to implement one or more virtual machines that host one or more guest operating systems and one or more applications;

a virtual bypass switch module comprising computer-executable instructions configured, when executed, to cause the one or more processors to:

monitor availability of the one or more applications hosted by the one or more virtual machines;

responsive to the availability of the one or more applications, forward packets received on the first physical network interface to at least one of the one or more virtual machines;

responsive to unavailability of the one or more applications, forward the packets received on the first physical network interface to the second physical network interface;

wherein the one or more computer systems comprises a first set of one or more computer systems and a second set of one or more computer systems;

wherein the first set of one or more computer systems comprises:

a first set of the one or more processors;
the bypass switch; and
the computer-executable program code comprising the virtual bypass switch module; and wherein the second set of one or more computer systems comprises: a second set of the one or more processors; and the computer-executable program code comprising the one or more virtual machines modules, the one or more virtual machines modules further comprising computer-executable instructions configured, when executed, to cause the second set of one or more processors of the second set of one or more computer systems to implement the one or more virtual machines.

2. The system of claim 1, wherein the first set of one or more computer systems further comprises a tunneling module comprising computer-executable instructions configured, when executed, to cause the first one or more processors to provide transport and encapsulation functionality between the first set one or more computer systems and the second set of one or more computer systems.

3. The system of claim 1, wherein the computer-executable instructions configured, when executed, to cause the one or more processors to, responsive to the availability of the one or more applications, forward the packets received on the first physical network interface to the at least one of the one or more virtual machines, comprises the computer-executable instructions further configured, when executed, to cause the one or more processors to forward the packets to a first virtual machine of the at least one of the one or more virtual machines, and, upon the processor receiving the packet back from the first virtual machine, subsequently forward the packets to a second virtual machine of the at least one of the one or more virtual machines.

4. The system of claim 1, wherein the computer-executable instructions configured, when executed, to cause the one or more processors to, responsive to the availability of the one or more applications, forward the packets received on the first physical network interface to the at least one of the one or more virtual machines, comprises the computer-executable instructions further configured, when executed, to cause the one or more processors to forward a first set of the packets to a first virtual machine of the at least one of the one or more virtual machines, and forward a second set of the packets to a second virtual machine of the at least one of the one or more virtual machines.

5. The system of claim 1, wherein the computer-executable instructions configured, when executed, to cause the one or more processors to monitor the availability of the one or more applications hosted by the one or more virtual machine modules, comprises the computer-executable instructions further configured, when executed, to cause the one or more processors to:
   send a signal to each of the one or more virtual machines, wherein the signal is configured to cause the one or more virtual machines to respond if the one or more applications hosted by the one or more virtual machines are available;
   responsive to receiving a response, determine that at least one of the one or more applications is available; and
   responsive to not receiving any response, determine that the one or more applications are unavailable.

6. The system of claim 1, wherein the computer-executable instructions configured, when executed, to cause the one or more processors to monitor the availability of the one or more applications hosted by the one or more virtual machine modules, comprises the computer-executable instructions further configured, when executed, to cause the one or more processors to:
   wait a pre-determined period of time in order to receive a heartbeat signal from each of the one or more virtual machines;
   responsive to receiving at least one of the heartbeat signals prior to the end of the pre-determined period of time, determine that at least one of the one or more applications is available; and
   responsive to not receiving any of the heartbeat signals prior to the end of the pre-determined period of time, determine that the one or more applications are unavailable.

7. The system of claim 1, wherein the direct connection formed by the bypass switch in the closed position is selected from one of:
   a direct electrical connection; and
   a direct optical connection.

8. The system of claim 1, wherein the virtual bypass switch module further comprises computer-executable instructions configured, when executed, to cause the one or more processors to:
   determine, based on instructions provided by a system administrator, a subset of the one or more virtual machines that may receive a subset of the packets received on the first physical network interface;
   wherein the computer-executable instructions configured, when executed, to cause the one or more processors to monitor availability of the one or more applications hosted by the one or more virtual machine modules, comprises the computer-executable instructions further configured, when executed, to cause the one or more processors to monitor availability of the one or more applications hosted by the subset of the one or more virtual machines;
   wherein the computer-executable instructions configured, when executed, to cause the one or more processors to, responsive to the availability of the one or more applications, forward the packets received on the first physical network interface to the at least one of the one or more virtual machines, comprises the computer-executable instructions further configured, when executed, to cause the one or more processors to, responsive to the availability of the one or more applications hosted by the subset of the one or more virtual machines, forward the subset of the packets to at least one of the virtual machines in the subset of the one or more virtual machines; and
   wherein the computer-executable instructions configured, when executed, to cause the one or more processors to, responsive to unavailability of the one or more applications, forward the packets received on the first physical network interface to the second physical network interface, comprises the computer-executable instructions further configured, when executed, to cause the one or more processors to, responsive to unavailability of the one or more applications hosted by the subset of the one or more virtual machines, forward the subset of the packets to the second physical network interface.

9. The system of claim 1, wherein the computer-executable instructions configured, when executed, to cause the one or more processors to, responsive to the availability of the one or more applications, forward the packets received on the first physical network interface to the at least one of the one or more virtual machines, comprises the computer-executable instructions further configured, when executed, to cause the one or more processors to:
   monitor a processing load of the at least one of the one or more virtual machines;
   in order to balance the processing load of a first virtual machine of the at least one of the one or more virtual machines with the processing load of a second virtual machine of the at least one of the one or more virtual machines, select a first set of the packets received on the first physical network interface and a second set of the packets received on the first physical network interface;
   forward the first set of the packets to the first virtual machine; and
   forward the second set of the packets to the second virtual machine.

10. The system of claim 1, wherein a first virtual machine operates in a standby mode as a backup to a second virtual machine; and wherein the virtual bypass switch is operative to:
    responsive to the availability of the one or more applications hosted on the second virtual machine, forward the packets received on the first physical network interface to the second virtual machine;
    responsive to the unavailability of the one or more applications hosted on the second virtual machine, forward the packets received on the first physical network interface to the first virtual machine.

11. The system of claim 1, wherein the first set of the one or more computer systems further comprises a first subset of the first set of the one or more computer systems and a second subset of the first set of the one or more computer systems;
    wherein the first subset of the first set of the one or more computer systems comprises:
      a first subset of the first set of the one or more processors; and
      the bypass switch; and
    wherein the second subset of the first set of the one or more computer systems comprises:
      a second subset of the first set of the one or more processors; and
      the computer-executable program code comprising the virtual bypass switch module.

12. A method, comprising:
- receiving one or more data signals on a first physical network interface of one or more computer systems;
- determining that the one or more computer systems are available to process the one or more data signals;
- in response to the determination that the one or more computer systems are available to process the one or more data signals, preventing the one or more data signals from being transported from a first port of the physical network interface to a second port of a second physical network interface over a direct connection between the first port of the first physical network interface and the second port of the second physical network interface;
- processing the one or more data signals into one or more packets;
- implementing one or more virtual machines that host one or more guest operating systems and one or more applications;
- monitoring availability of the one or more applications hosted by the one or more virtual machines;
- responsive to the availability of the one or more applications, forwarding the one or more packets received on the first physical network interface to at least one of the one or more virtual machines; and
- responsive to the unavailability of the one or more applications, forwarding the one or more packets received on the first physical network interface to the second physical network interface;
- wherein determining that the one or more computer systems are available to process the one or more data signals, comprises determining that a first set of one or more computer systems are available to process the one or more data signals;
- wherein implementing one or more virtual machines that host one or more guest operating systems and one or more applications, comprises implementing, at a second set of one or more computer systems, the one or more virtual machines that host the one or more guest operating systems and the one or more applications;
- wherein monitoring availability of the one or more applications hosted by the one or more virtual machines, comprises monitoring, at the first set of one or more computers, the availability of the one or more applications hosted by the one or more virtual machines; and
- wherein responsive to the availability of the one or more applications, forwarding the one or more packets received on the first physical network interface to at least one of the one or more virtual machines, comprises responsive to the availability of the one or more applications, forwarding, from the first set of one or more computers, the one or more packets received on the first physical network interface to the at least one of the one or more virtual machines implemented at the second set of one or more computers.

13. The method of claim 12, further comprising providing, at the first set of one or more computers, transport and encapsulation functionality between the first set of one or more computer systems and the second set of one or more computer systems, in order to forward the one or more packets received on the first physical network interface to the at least one of the one or more virtual machines implemented at the second set of one or more computers.

14. The method of claim 12, further comprising, upon receiving the one or more packets back from the at least one of the one or more virtual machines, subsequently forwarding the one or more packets to a different virtual machine of the one or more virtual machines.

15. The method of claim 12, wherein responsive to the availability of the one or more applications, forwarding the one or more packets received on the first physical network interface to at least one of the one or more virtual machines, comprises responsive to the availability of the one or more applications, forwarding a first set of the packets to a first virtual machine of the one or more virtual machines, and forwarding a second set of the packets to a second virtual machine of the one or more virtual machines.

16. The method of claim 12, wherein monitoring the availability of the one or more applications hosted by the one or more virtual machines, comprises:
- sending a signal to each of the one or more virtual machines, wherein the signal is configured to cause the one or more virtual machines to respond if the one or more applications hosted by the one or more virtual machines are available;
- responsive to receiving a response, determining that at least one of the one or more applications is available; and
- responsive to not receiving any response, determining that the one or more applications are unavailable.

17. The method of claim 12, wherein monitoring the availability of the one or more applications hosted by the one or more virtual machines, comprises:
- waiting a pre-determined period of time in order to receive a heartbeat signal from each of the one or more virtual machines;
- responsive to receiving at least one of the heartbeat signals prior to the end of the pre-determined period of time, determining that at least one of the one or more applications is available; and
- responsive to not receiving any of the heartbeat signals prior to the end of the pre-determined period of time, determining that the one or more applications are unavailable.

18. The method of claim 12, further comprising:
- determining, based on instructions provided by a system administrator, a subset of the one or more virtual machines that may receive a subset of the packets received on the first physical network interface; and
- wherein monitoring availability of the one or more applications hosted by the one or more virtual machines, comprises monitoring availability of the one or more applications hosted by the subset of the one or more virtual machines;
- wherein, responsive to the availability of the one or more applications, forwarding the one or more packets received on the first physical network interface to at least one of the one or more virtual machines, comprises, responsive to the availability of the one or more applications hosted by the subset of the one or more virtual machines, forwarding the subset of the packets to at least one of the virtual machines in the subset of the one or more virtual machines; and
- wherein, responsive to the unavailability of the one or more applications, forwarding the one or more packets received on the first physical network interface to the second physical network interface, comprises, responsive to unavailability of the one or more applications hosted by the subset of the one or more virtual machines, forwarding the subset of the packets to the second physical network interface.

19. The method of claim 12, wherein, responsive to the availability of the one or more applications, forwarding the one or more packets received on the first physical network interface to at least one of the one or more virtual machines, comprises:

monitoring a processing load of the at least one of the one or more virtual machines;

in order to balance the processing load of a first virtual machine of the at least one of the one or more virtual machines with the processing, load of a second virtual machine of the at least one of the one or more virtual machines, selecting a first set of the packets received on the first physical network interface and a second set of the packets received on the first physical network interface;

forwarding the first set of the packets to the first virtual machine; and forwarding the second set of the packets to the second virtual machine.

20. A system, comprising:

one or more computer systems comprising:
- a memory,
- one or more processors;
- a bypass switch, a first physical network interface and a second physical network interface, wherein the bypass switch has an open position and a closed position and the first physical network interface has a first port and the second physical network interface has a second port; wherein the closed position corresponds to the bypass switch forming a direct connection between the first and second ports of the first and second physical network interfaces thus bypassing processing of the data signals by the first and second physical network interfaces; wherein, in the open position, the first and second physical network interfaces are operative to process data signals received at the first and second ports; and wherein the bypass switch is responsive to control signals to move from the open position to the closed position, wherein the direct connection formed by the bypass switch in the closed position is selected from one of:
    - a direct electrical connection; and
    - a direct optical connection; and
- computer-executable program code stored in the memory and executable by the one or more processors, the computer-executable program code comprising
- one or more virtual machines modules comprising computer-executable instructions configured, when executed, to cause the one or more processors to implement one or more virtual machines that host one or more guest operating systems and one or more applications;
- a virtual bypass switch module comprising computer-executable instructions configured, when executed, to cause the one or more processors to:

monitor availability of the one or more applications hosted by the one or more virtual machines, wherein the computer-executable instructions configured, when executed, to cause the one or more processors to monitor the availability of the one or more applications hosted by the one or more virtual machine modules, comprises the computer-executable instructions further configured, when executed, to cause the one or more processors to:

send a signal to each of the one or more virtual machines, wherein the signal is configured to cause the one or more virtual machines to respond if the one or more applications hosted by the one or more virtual machines are available;

responsive to receiving a response, determine that at least one of the one or more applications is available; and responsive to not receiving any response, determine that the one or more applications are unavailable, responsive to the availability of the one or more applications, forward packets received on the first physical network interface to at least one of the one or more virtual machines, wherein the computer-executable instructions configured, when executed, to cause the one or more processors to, responsive to the availability of the one or more applications, forward the packets received on the first physical network interface to the at least one of the one or more virtual machines, comprises the computer-executable instructions further configured, when executed, to cause the one or more processors to:

monitor a processing load of the at least one of the one or more virtual machines;

in order to balance the processing load of a first virtual machine of the at least one of the one or more virtual machines with the processing load of a second virtual machine of the at least one of the one or more virtual machines, select a first set of the packets received on the first physical network interface and a second set of the packets received on the first physical network interface;

forward the first set of the packets to the first virtual machine; and forward the second set of the packets to the second virtual machine;

responsive to unavailability of the one or more applications, forward the packets received on the first physical network interface to the second physical network interface;

wherein the one or more computer systems comprises a first set of one or more computer systems and a second set of one or more computer systems;

wherein the first set of one or more computer systems comprises:
- a first set of the one or more processors;
- the bypass switch; and
- the computer-executable program code comprising the virtual bypass switch module; and wherein the second set of one or more computer systems comprises:
- a second set of the one or more processors; and
- the computer-executable program code comprising the one or more virtual machines modules; and wherein the first set of one or more computer systems further comprises a tunneling module comprising computer-executable instructions configured, when executed, to cause the first one or more processors to provide transport and encapsulation functionality between the first set of one or more computer systems and the second set of one or more computer systems.

* * * * *